US008521773B2

(12) United States Patent
Evans et al.

(10) Patent No.: US 8,521,773 B2
(45) Date of Patent: Aug. 27, 2013

(54) SYSTEM AND METHOD FOR WEB MINING AND CLUSTERING

(75) Inventors: Scott Charles Evans, Burnt Hills, NY (US); Abha Moitra, Scotia, NY (US); Thomas Stephen Markham, Niskayuna, NY (US); Steven Matt Gustafson, Niskayuna, NY (US)

(73) Assignee: NBCUniversal Media, LLC, New York, NY (US)

( * ) Notice: Subject to any disclaimer, the term of this patent is extended or adjusted under 35 U.S.C. 154(b) by 585 days.

(21) Appl. No.: 12/787,114

(22) Filed: May 25, 2010

(65) Prior Publication Data

US 2011/0295892 A1 Dec. 1, 2011

(51) Int. Cl.
*G06F 17/30* (2006.01)

(52) U.S. Cl.
USPC ............... 707/776; 707/E17.107; 707/736; 707/777; 707/999.006

(58) Field of Classification Search
None
See application file for complete search history.

(56) References Cited

U.S. PATENT DOCUMENTS

| | | | |
|---|---|---|---|
| 6,591,248 B1 | 7/2003 | Nakamura et al. | |
| 7,280,986 B2 | 10/2007 | Goldberg et al. | |
| 2005/0102292 A1* | 5/2005 | Tamayo et al. | 707/10 |
| 2006/0085788 A1 | 4/2006 | Amir et al. | |
| 2007/0244909 A1* | 10/2007 | Moyaux et al. | 707/10 |
| 2009/0055425 A1 | 2/2009 | Evans et al. | |
| 2010/0121850 A1* | 5/2010 | Moitra et al. | 707/737 |
| 2011/0060716 A1* | 3/2011 | Forman et al. | 706/54 |

OTHER PUBLICATIONS

T. Stephen Markham, Scott C. Evans, Jeremy Impson and Eric Steinbrecher; "Implementation of an Incremental MDL-based Two Part Compression Algorithm for Model Inference"; http://portal.acm.org/citation.cfm?id=1545013.1545583; 10 Pages.
Terrance Goan, Nels Benson and Oren Etzioni; "A Grammar Inference Algorithm for the World Wide Web"; http://www.aaai.org/Papers/Symposia/Spring/1996/SS-96-05/SS96-05-006.pdf ; 8 Pages.

* cited by examiner

*Primary Examiner* — Anteneh Girma
(74) *Attorney, Agent, or Firm* — Fletcher Yoder

(57) ABSTRACT

A method and system for web mining and clustering is described. The method includes receiving and dividing input data into a plurality of primitive datasets. Additionally, one or more combinations of the plurality of primitive datasets may be created. Further, a model for each primitive dataset in the plurality of primitive datasets and each of the one or more combinations of the plurality of primitive datasets may be generated. Subsequently, a cost associated with a model corresponding to each primitive dataset in the plurality of primitive datasets, and each of the one or more combinations of the plurality of primitive datasets may be computed. Further, a sum of the costs associated with the models corresponding to each primitive dataset in the plurality of primitive datasets may be compared with the cost associated with each model corresponding to each of the one or more combinations of the plurality of primitive datasets. Finally, the plurality of primitive datasets may be partitioned into one or more clusters based on the comparison of the costs such that each primitive dataset is a part of a cluster in the one or more clusters or a stand-alone primitive dataset.

20 Claims, 5 Drawing Sheets

SYSTEM AND METHOD FOR WEB MINING AND CLUSTERING

BACKGROUND

Embodiments of the present technique relate generally to web mining, and more particularly to web mining and clustering techniques for generating online predictions and recommendations.

Evolution of the Internet has resulted in a proliferation of e-commerce, web services and web based information systems where users are often forced to choose from an overwhelming amount of web content. Much of the web content, however, lies buried in documents designed for human consumption, such as home pages or product catalogs. Extracting relevant data from the web content available online in a multitude of formats and making this web content dynamically available to the users remains a complex and relevant task. Therefore, to aid a user's decision-making process, it has become increasingly important to design effective and intuitive business intelligence tools such as web mining, clustering and recommender systems. These business intelligence tools enable identification of user preferences, thereby allowing businesses to offer the users personalized product, service and content offerings.

Accordingly, numerous web sites provide the users with dynamic recommendations for products and services, targeted banner advertising, and personalized link selections. Such personalized recommendations enhance web-browsing experience for the users, thereby increasing sales of products and services. Design and implementation of effective web mining, clustering and/or recommender systems, therefore, has become critical to the success of e-commerce websites. To that end, the web mining systems are designed to model web data and determine usage patterns for optimization of web architecture and marketing of content.

Typically, web-mining systems perform three basic functions, namely preprocessing, sequential pattern discovery and sequential pattern analysis. The sequential pattern discovery techniques attempt to identify inter-session patterns, whereas the sequential pattern analysis techniques attempt to predict visit patterns of future users and recommend web pages to the users based on the identified patterns. Conventional web mining techniques, however, require manual intervention of a domain expert for establishing a context corresponding to the web usage patterns of the users. Identification of the patterns, therefore, may be subjective and may include several assumptions while grouping the web usage patterns under a particular context. Moreover, the conventional web mining techniques do not compensate for inaccurate assumptions, thereby generating erroneous patterns. Further, with the continual addition of online users and content, the identified patterns may quickly become obsolete or invalid.

It may therefore be desirable to develop an objective web mining and clustering method and system that dynamically identify meaningful patterns from web usage data with minimum assumptions and/or bias. Further, there is a need for a system that provides relevant recommendations to the users based on the identified patterns. Additionally, it may be desirable to develop the system that allows scalability and ability to adapt to dynamic changes in online user base and content.

BRIEF DESCRIPTION

In accordance with aspects of the present technique, a method for web mining and clustering is presented. The method includes receiving and dividing input data into a plurality of primitive datasets. Additionally, one or more combinations of the plurality of primitive datasets may be created. Further, a model for each primitive dataset in the plurality of primitive datasets and each of the one or more combinations of the plurality of primitive datasets may be generated. Subsequently, a cost associated with a model corresponding to each primitive dataset in the plurality of primitive datasets, and each of the one or more combinations of the plurality of primitive datasets may be computed. Further, a sum of the costs associated with the models corresponding to each primitive dataset in the plurality of primitive datasets may be compared with the cost associated with each model corresponding to each of the one or more combinations of the plurality of primitive datasets. Finally, the plurality of primitive datasets may be partitioned into one or more clusters based on the comparison of the costs such that each primitive dataset is a part of a cluster in the one or more clusters or a stand-alone primitive dataset.

In accordance with a further aspect of the present technique, a web mining and clustering system is described. The web mining and clustering system may include a pre-processor that receives input data and generates a plurality of primitive datasets and one or more combinations of the plurality of primitive datasets using the input data. Additionally, the web mining and clustering system may include a grammar generator and a grammar applicator. The grammar generator may generate a model corresponding to each primitive dataset in the plurality of primitive datasets, and the one or more combinations of the plurality of primitive datasets, wherein the grammar generator is operationally coupled to the pre-processor. The grammar applicator may compute a cost associated with the model corresponding to each primitive dataset in the plurality of primitive datasets, and the one or more combinations of the plurality of primitive datasets. The web mining and clustering system may further include a classifier that partitions the plurality of primitive datasets such that each primitive dataset is a part of a cluster in the one or more clusters or a stand-alone primitive dataset. Particularly, the classifier may partition the plurality of primitive datasets based on a comparison of a sum of the costs associated with the models corresponding to each primitive dataset with the cost associated with each model corresponding to each of the one or more combinations of the plurality of primitive datasets.

In accordance with another aspect of the present technique, computer readable media embodying instructions for web mining and clustering are presented. The instructions which when executed by a processor may cause the computer to execute the steps of receiving input data and dividing the input data into a plurality of primitive datasets. Additionally, one or more combinations of the plurality of primitive datasets may be created. Further, a model for each primitive dataset in the plurality of primitive datasets and each of the one or more combinations of the plurality of primitive datasets may be generated. A cost associated with a model corresponding to each primitive dataset in the plurality of primitive datasets, and each of the one or more combinations of the plurality of primitive datasets may be computed. Subsequently, a sum of the costs associated with the models corresponding to each primitive dataset in the plurality of primitive datasets may be with the cost associated with each model corresponding to each of the one or more combinations of the plurality of primitive datasets. Finally, the plurality of primitive datasets may be partitioned into one or more clusters based on the comparison of the costs such that each primitive dataset is a part of a cluster in the one or more clusters or a stand-alone primitive dataset.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description presents a technique for web mining and clustering. Particularly, the embodiments illustrated hereinafter describe a system and a method for web mining and clustering based on the minimum description length (MDL) principles. As used herein, the term "web mining" refers to a technique for searching, collating and analyzing patterns in web content by using one or more data mining techniques and attributes such as clustering, classification, association, and examination of sequential patterns. Typically, web mining may include content mining, structure mining and usage mining. Content mining may be used to search, collate and examine data using search engine algorithms, whereas structure mining may be used to examine a web site structure and collate and analyze related data. Further, usage mining may relate to examination of client end data, such as profiles of web site users, browser specifications, a specific time and period of surfing the web site, specific areas of interests of the users and related data submitted during web transactions and feedback. In the following sections, the term "web mining" may be used to refer to one or more of content mining, structure mining and usage mining. Further, as used herein, the term "clustering" refers to an unsupervised learning technique that assigns a set of observations into clusters such that observations within a cluster are similar in some sense. Particularly, clustering may partition the web content such as web pages into different genres or contexts to form corresponding clusters.

Although the present technique is described with reference to mining and clustering of web content, the present technique may be used in a plurality of operating environments and systems for mining and clustering different types of data. By way of example, the present technique may be used for similarity searching in medical image databases, bioinformatics, image analysis, market research, software code evolution, and so on. An exemplary environment that is suitable for practising various implementations of the present technique will be discussed in the following sections with reference to FIG. 1.

Figure 1:
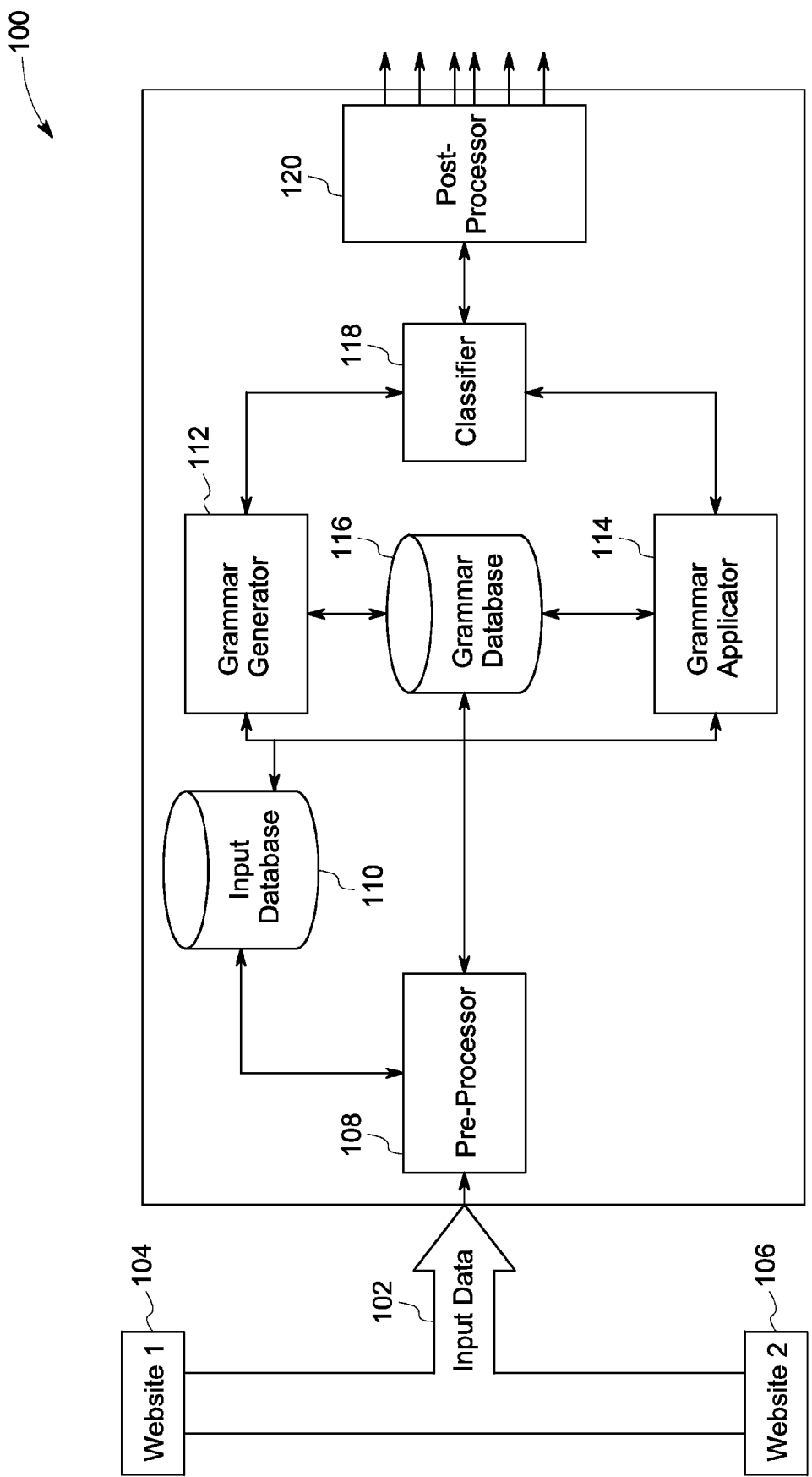
FIG. 1 is a block diagram of an exemplary web mining and clustering system that generates models for clustering data, in accordance with aspects of the present technique.

FIG. 1 illustrates an exemplary web mining and clustering system 100 that generates a plurality of models for clustering input data 102. In one embodiment, the input data 102 may include proprietary account or user-based data, web server data, or web transaction data. The web server data may include web traffic data obtained by Transmission Control Protocol/Internet Protocol (TCP/IP) packet sniffing, whereas the web transaction data may be obtained from an application program interface of the web server, or a log file of the web server. In the embodiment of the web mining and clustering system 100 illustrated in FIG. 1, the web mining and clustering system 100 may receive the input data 102 from a plurality of web sites 104 and 106. Although FIG. 1 depicts two web sites, it may be noted that the input data 102 may be received from fewer or more web sites, mobile applications, or any other systems communicatively coupled to the web mining and clustering system 100.

Further, the web mining and clustering system 100 may include a pre-processor 108 that may receive the input data 102 from at least one of the websites 104 and 106. By way of example, the pre-processor 108 may include one or more microprocessors, microcomputers, microcontrollers, dual core processors, and so forth. In accordance with aspects of the present technique, the pre-processor 108 may further divide the input data 102 into a plurality of primitive datasets. As used herein, the term "primitive datasets" may refer to datasets generated by the pre-processor 108, where the primitive datasets include raw or processed data corresponding to a portion of the input data 102. By way of example, the pre-processor 108 may generate the plurality of primitive datasets by dividing the input data 102 based on a determined window size. In one embodiment, an operator may choose a window size for generating the plurality of primitive datasets from the input data 102. In alternative embodiments, however, the window size for generating the plurality of primitive datasets from the input data 102 may be controlled by monitoring resources corresponding to the web mining and clustering system 100. By way of example, the input data 102 may be divided into the plurality of primitive datasets of about 1000 bytes each until the web mining and clustering system 100 is low on memory. The plurality of primitive datasets, thus generated may avoid effects of any subjective assumptions and/or bias during clustering. Further, in certain other embodiments, the pre-processor 108 may filter the input data 102 to remove redundant or irrelevant information while forming the primitive datasets. Particularly, based on desired application requirements, the pre-processor 108 may process input data 102 to extract user identification, session information, webpage classification, and page titles, or combinations thereof, to form the primitive datasets. Further, the pre-processor 108 may also create one or more combinations of the primitive datasets by combining one or more of the primitive datasets.

Further, in one embodiment, the plurality of primitive datasets and the one or more combinations of the plurality of primitive datasets generated from the input data 102 may be stored in an input database 110. Accordingly, the input database 110 may be communicatively coupled to the pre-processor 108. The input database 110 may further be coupled to a grammar generator 112 and a grammar applicator 114 for appropriately classifying the plurality of primitive datasets and the one or more combinations of the primitive datasets. In accordance with aspects of the present technique, the grammar generator 112 may generate a model corresponding to each primitive dataset and each combination of the plurality of primitive datasets. As used herein, the term "model" may refer to a grammar that identifies key motifs in the input data 102 that aid in compressing the input data 102. Typically, the grammar may include a set of rules that define an equivalence between the identified key motifs and the models that may be stored in a grammar database 116 operationally coupled to the grammar generator 112. Specifically, the grammar generator 112 may generate a plurality of models that compressively cluster each primitive dataset and each combination of the primitive datasets. To that end, the grammar generator 112 may include one or more microprocessors, microcomputers, microcontrollers, dual core processors, and so forth. The grammar generator 112 may subsequently store the generated models in the grammar database 116.

In accordance with aspects of the present technique, the grammar generator 112 may employ a grammar inference algorithm that uses MDL principles to generate a set of rules for effectively clustering the plurality of primitive datasets. Particularly, in one embodiment, the grammar generator 112 may use the MDL principles corresponding to the Kolmogorov complexity and algorithmic information theory (MDLcompress algorithm) to infer a grammar for finding patterns and motifs that achieve a high degree of compression in unknown data sets. The grammar generator 112 may employ the MDLcompress algorithm to infer a two-part MDL code for generating models that may effectively compress each primitive dataset and each combination of primitive datasets.

By way of example, the MDLcompress algorithm may be used to compressively cluster primitive datasets corresponding to a sample phrase such as "a rose is a rose is a rose" generally represented by 'S'. The MDLcompress algorithm may identify seven symbols {a; space; r; o; s; e; i} in an initial symbol alphabet corresponding to the sample phrase. Further, the MDLcompress algorithm may determine several candidate phrases for a model corresponding to the sample phrase. In accordance with aspects of the present technique, the MDLcompress algorithm may select a rule that may lead to a least number of bits required to store a sample grammar, such as, "a rose" generally represented by 'S1'. The selected rule may be added to the sample grammar and instances of the phrase "a rose" may be replaced with $S_1$.

$$S1 \rightarrow \text{"a rose"}, S \rightarrow \text{"S1 is S1 is S1"} \quad (1)$$

In a second iteration, the MDLcompress algorithm may add a second phrase "S1 is" to the sample grammar as shown in equation (2).

$$S2 \rightarrow \text{"S1 is"}; S1 \rightarrow \text{"a rose"}; S \rightarrow \text{"S2S2S1"} \quad (2)$$

The MDLcompress algorithm may perform further iterations until it fails to find a phrase that reduces the number of bits required to store the sample grammar. This sample grammar may correspond to the model selected for clustering the sample phrase. The MDLcompress algorithm, therefore, may provide significant improvement over conventional clustering techniques in which addition of new rules expands the alphabet, thereby requiring a greater number of bits to store the model.

Generally, the following algorithms depict exemplary steps corresponding to the MDLcompress algorithm for compressively clustering the plurality of primitive datasets.

---

Algorithm 1: MDLcompress

---

Input: Input stream
Output: Model of data
while Input stream is still producing symbols do
if Resources available, Input available, and not end of window then
Get next input symbol, S;
Add S to data structure (Algorithm 2);
end

---

-continued

---

Algorithm 1: MDLcompress

---

Find phrase, P, with best score;
if P's score is better than a threshold then
Add P to the model;
Update the data structure (Algorithm 3);
end
end

---

Algorithm 2: Adding a new symbol to a data structure

---

Input: indexBox, longest active phrase P, and new symbol S
Output: Updated data structure, including indexBox, phraseArray, and longestActivePhrase
while P 6= ; do
if PS is a potentialCandidate then
make it a child;
add new potentialCandidate from its prior occurrence;
end
if PS is a child then
add the new startIndex;
set indexBox to point to the phrase;
update the score;
if P is the longest active phrase then
longestActivePhrase ← PS;
end
end
if PS is neither potentialCandidate nor child then
create the potentialCandidate
longestActivePhrase ← P.suffix;
end
P ← P.suffix;
end
add startIndex to S's phrase;
update indexBox to point to S;

---

Algorithm 3: Updating the data structure after selecting a phrase

---

Input: indexBox, longestActivePhrase, chosen phrase P, phraseArray
Output: Updated data structure, including scores, indexBox, and longestActivePhrase
Search indexBox in the vicinity of each occurrence of P, identifying affectedPhrases;
foreach affectedPhrase a do
Find overlapping occurrences of a and P;
As appropriate: Remove start indices from a;
Update a.prefix and/or a.suffix;
Update a.score;
Downgrade a to a potentialCandidate;
Update longestActivePhrase;
End

---

Thus, based on the available time and resources, the MDLcompress algorithm may generate a best possible candidate for the model corresponding to each primitive dataset and each combination of the primitive datasets. Further, the compressive nature of the MDLcompress algorithm may simplify additions to the model required for subsequently received input data, thereby reducing execution times. As previously noted, the models generated by the grammar generator 112 using the MDLcompress algorithm may subsequently be stored in the grammar database 116 for future use.

In accordance with aspects of the present technique, the grammar applicator 114 may use the models stored in the grammar database 116 for clustering the plurality of primitive datasets. Particularly, the grammar applicator 114 may apply one or more of the models generated by the grammar generator 112 to each primitive dataset and to each combination of the primitive datasets. Although FIG. 1 depicts the grammar generator 112 and the grammar applicator 114 separately, in certain embodiments, the grammar generator 112 may be combined with the grammar applicator 114 for implementation as a single entity. By way of example, the grammar generator 112 and the grammar applicator 114 may be implemented as an embedded system or as a single module on a Windows or Linux based workstation. Moreover, the grammar applicator 114 may compute a cost associated with a model corresponding to each primitive dataset and each combination of the primitive datasets. The computed cost may correspond to a number of bits required to represent a particular primitive dataset and the model corresponding to the particular primitive dataset or the particular combination of the primitive datasets.

In addition, the grammar applicator 114 may communicate the computed cost associated with each primitive dataset and each combination of the primitive datasets to a classifier 118. The classifier 118 may verify a corresponding degree of compression of each primitive dataset and each combination of primitive datasets achieved by a particular model based on the cost associated with each primitive dataset and each combination of primitive datasets. To that end, the classifier 118 may include nearest neighbor classification systems, support vector machines, random forest classification systems, or other multi-feature, multi-dimensional classification systems.

Furthermore, the classifier 118 may compare a sum of the costs associated with the models corresponding to each primitive dataset with the cost associated with the models corresponding to each combination of the primitive datasets. Particularly, the classifier 118 performs the comparison to determine a model that may achieve better compression performance as compared to all other available models. The compression performance corresponding to each model may be indicated by the cost associated with the model. Therefore, if the sum of the costs associated with the models corresponding to each primitive dataset is greater than the costs associated with the models corresponding to each combination of the primitive datasets, the primitive datasets in the combination may be combined into a single cluster. Alternatively, the plurality of primitive datasets may be represented as stand-alone primitive datasets. As used herein, the term "stand-alone primitive datasets" may correspond to certain primitive datasets where a sum of the costs associated with the models corresponding to each of the certain primitive datasets is less than the cost associated with the model corresponding to each combination of the primitive datasets. The classifier 118 may perform further iterations of the clustering process until none of the available primitive datasets may be best represented as a combination of the primitive datasets. Subsequently, the generated clusters, stand-alone primitive datasets and other related data may be communicated to a post-processor 120 for further processing.

In accordance with aspects of the present technique, the post-processor 120 may determine a pattern or a context corresponding to each of the generated clusters and/or stand-alone primitive datasets. In one embodiment, the post-processor 120 may use the MDLcompress algorithm to determine the patterns corresponding to the generated clusters and the stand-alone primitive datasets. Specifically, the post-processor 120 may determine typical characteristics and/or atypical characteristics corresponding to each of the generated clusters and the stand-alone primitive datasets. By way of example, the post-processor 120 may use the MDLcompress algorithm to determine patterns in the input data 102 that indicate typical characteristics identified from the web traffic associated with the first website 104. Additionally, the post-processor 120 may further identify atypical characteristics such as erratic, anomalous, or unexpected web usage behavior in the input data 102. In one embodiment, the web traffic may spike in response to breaking news. The post-processor 120 may rapidly determine and analyze patterns in the web traffic data such as click-through data for identifying new sources of the web traffic or for profiling user behavior such as an order of links visited, amount of time spent on each webpage, and so on. Based on the determined pattern, the post-processor 120 may perform a specific action to provide relevant information to users associated with a generated cluster or a stand-alone primitive dataset. By way of example, the specific action may include displaying an advertisement, recommending content and/or personalizing a webpage. Specifically, the post-processor 120 may perform the specific action based on the determined typical and/or the determined atypical characteristics corresponding to a generated cluster or a stand-alone primitive dataset. The functioning of the post-processor 120 and certain other components illustrated in FIG. 1 will be described in greater detail with reference to FIGS. 2-5.

Figure 2:
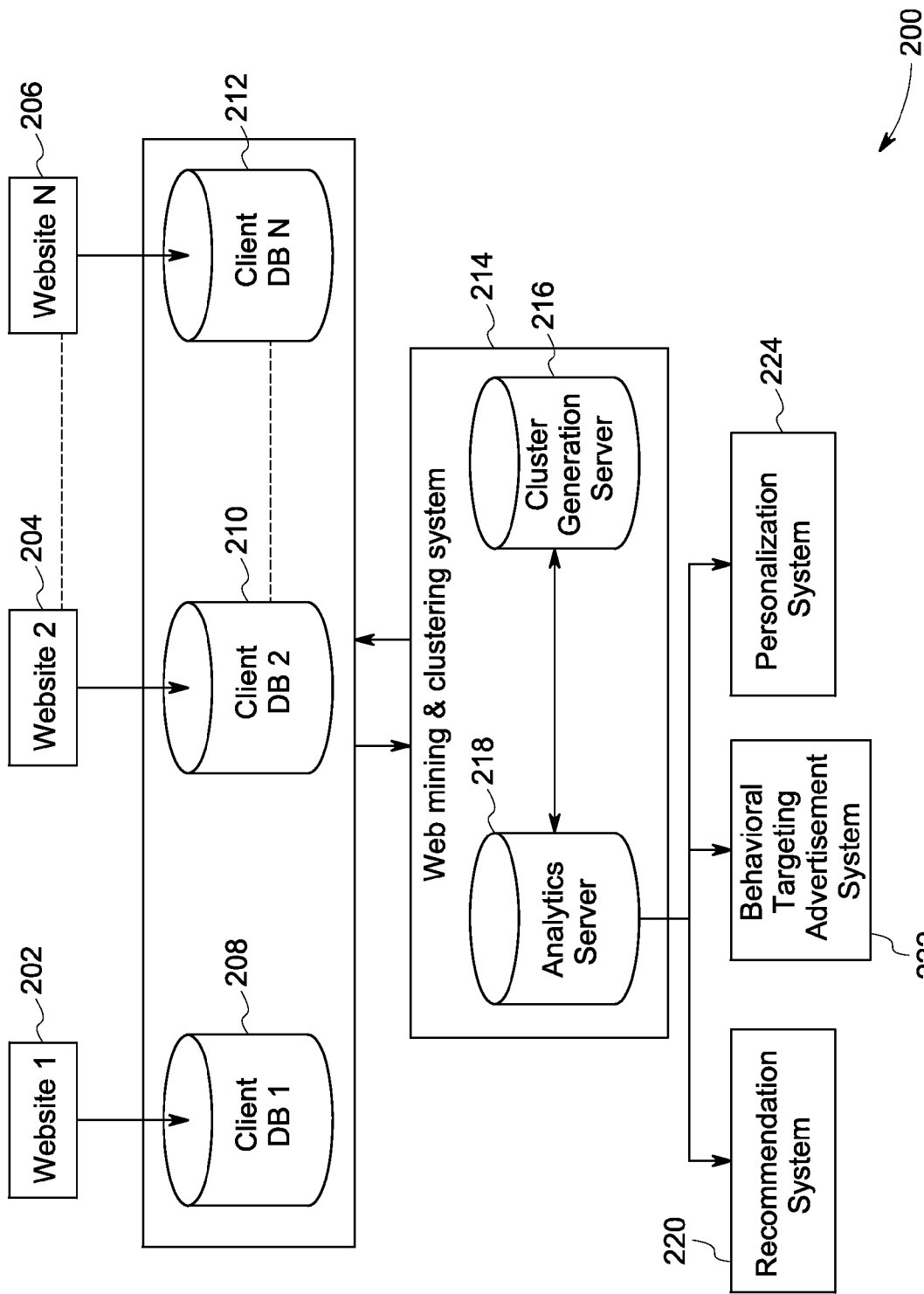
FIG. 2 is a block diagram of an environment that facilitates web mining and clustering, and personalization of web content based on clustered web content, in accordance with aspects of the present technique.

FIG. 2 illustrates a block diagram of an environment 200 that facilitates adaptive web mining and clustering described with reference to FIG. 1. To that end, the environment 200 includes a plurality of input data sources such as a first website 202, a second website 204, an Nth website 206, and so on. Although FIG. 2 illustrates the environment 200 as including the three websites 202, 204 and 206, the input data may be received from fewer or greater number of websites, mobile applications, or any other measurement systems available in the environment 200. By way of example, the input data may be representative of metrics and/or usage patterns corresponding to different users visiting the first website 202, the second website 204 and/or the Nth website 206. In one embodiment, the first website 202 may correspond to a health and lifestyle website. Similarly, the second website 204 may correspond to a hardware and tools website, whereas the Nth website 206 may correspond to a banking website.

The input data received from each of the websites 202, 204 and 206 may be stored in corresponding client databases 208, 210 and 212, respectively. The input data may then be communicated to a web mining and clustering system 214, such as the web mining and clustering system 100 of FIG. 1 for further processing. Specifically, the web mining and clustering system 214 may perform one or more functions of the pre-processor 108, the grammar generator 112, the grammar applicator 114 and the classifier 118 of FIG. 1. Thus, the web mining and clustering system 214 may pre-process the input data to generate a plurality of primitive datasets and one or more combinations of the primitive datasets. Further, the web mining and clustering system 214 may generate a model for each primitive dataset and for each combination of the primitive datasets. To that end, the web mining and clustering system 214 may include a cluster generation server 216 for generating a model corresponding to each primitive dataset and each combination of the primitive datasets. Specifically, the cluster generation server 216 may generate the model corresponding to each primitive dataset and each combination of the primitive datasets using a compression algorithm such as the MDLcompress algorithm.

In one embodiment, the cluster generation server 216 may use the MDLcompress algorithm to analyze primitive datasets generated from the input data received from users of the websites 202, 204 and 206. Particularly, the cluster generation server 216 uses the MDLcompress algorithm to analyze primitive datasets corresponding to click-streams of the users to track progress of the users across the websites 202, 204 and 206, time spent on each webpage, transactions completed, and so on. Based on this analysis, the cluster generation server 216 may use the MDLcompress algorithm to determine one or more typical patterns in the primitive datasets that may be representative of a particular behavior common to the users of the websites 202, 204 and 206. By way of example, the cluster generation server 216 may use the MDLcompress algorithm to determine a pattern corresponding to the sequence of web pages visited by the users and the time spent on each webpage.

The cluster generation server 216 using the MDLcompress algorithm, thus, may provide an objective means to identify key patterns in the primitive datasets generated from the input data received from the users, model user behavior and cluster groups of like users. Further, the cluster generation server 216 may also apply the MDLcompress algorithm to independent user browsing sessions for identifying user-context switching, thereby identifying atypical behavior that may differ from the typical pattern of behavior exhibited by other users corresponding to the same cluster. To that end, the cluster generation server 216 may use a two-part grammar corresponding to the MDLcompress algorithm to generate models that provide an indication of both typical and atypical behavior of a user belonging to a particular cluster.

By way of example, the cluster generation server 216 may use the MDLcompress algorithm for analyzing DNA sequences in the absence of assumptions or previously available information. To that end, the cluster generation server 216 may use raw sequences instead of conventional protein triples to identify new motifs or patterns in the DNA sequence that have particular meaning, and hence when mutated may indicate a particular disease such as cancer. In one embodiment, the cluster generation server 216 may selectively identify sequences that are short but occur frequently such as codons including three nucleotides each as candidate patterns. Additionally, the cluster generation server 216 may identify candidate patterns corresponding to sequences that are relatively long but occur only a small number of times such as miRNA target sites that include more than 20 nucleotides. In one embodiment, the cluster generation server 216 may use the MDLcompress algorithm to determine frequency information and a location of a candidate pattern in the raw sequences to appropriately identify meaningful patterns such as a particular miRNA target. The cluster generation server 216 may use the frequency and location information corresponding to the candidate pattern to infer and/or refine a model that may determine if the candidate pattern corresponds to the particular miRNA target.

In certain embodiments, the cluster generation server 216 may provide available assumptions and contexts to the MDLcompress algorithm for generating an appropriate model. Unlike conventional algorithms, however, the MDLcompress algorithm may compensate for erroneous assumptions by validating and correcting the assumptions provided. By way of example, if the cluster generation server suggests four clusters, the MDLcompress algorithm may objectively consider three or five clusters to determine if four is an appropriate assumption for the number of clusters.

In accordance with aspects of the present technique, the cluster generation server 216 may apply one or more previously generated models to each primitive dataset and to each of the one or more combinations of the primitive datasets for compressively clustering the primitive datasets. Subsequently, the cluster generation server 216 may compute a cost associated with the model corresponding to each primitive dataset and each of the one or more combinations of the primitive datasets. Further, the cluster generation server 216 may compare a sum of the costs associated with the model corresponding to each primitive dataset with the cost associated with the model corresponding to each of the one or more combinations of the plurality of primitive datasets. If the sum of the costs associated with the models corresponding to each primitive dataset is greater, the primitive datasets in the combination may be combined into a single cluster. Alternatively, the primitive datasets may be represented as stand-alone primitive datasets if the sum of the costs associated with the models corresponding to each primitive dataset is lesser than the cost associated with the model corresponding to each of the one or more combinations of the primitive datasets. As previously noted, the process of model and cluster generation may be repeated until none of the available primitive datasets may be best represented as a combination of the primitive datasets. In one embodiment, the best representation may correspond to a clustering that uses the least number of bits to represent each primitive dataset, each combination of primitive datasets, and the corresponding models.

In accordance with aspects of the present technique, a subsequently received primitive dataset corresponding to input data received from a new user may undergo a similar clustering process. Specifically, one or more patterns representative of characteristics corresponding to the subsequently received primitive dataset may be determined. The cluster generation server 216 may add the subsequently received primitive dataset to an existing cluster if one or more determined patterns corresponding to the subsequently received primitive dataset substantially match a determined pattern corresponding to the cluster. Once the subsequently received primitive dataset has been added to the cluster, one or more atypical characteristics corresponding to the subsequently received primitive dataset may be recommended to existing members of the cluster. Additionally, one or more atypical characteristics corresponding to the cluster may be recommended to the new user. The atypical characteristics corresponding to the subsequently received primitive dataset may correspond to the characteristics or behavior of the new user that may be substantially different from other users associated with the cluster. Similarly, atypical characteristics corresponding to the cluster may correspond to characteristics or behavior that may not be shared by a majority of the users associated with the cluster. Thus, the cluster generation server 216 may incrementally add new input data to existing clusters, thereby dynamically updating the clusters to account for frequent changes in online user base and/or web content.

Subsequently, the clusters generated by the cluster generation server 216 may be analyzed for use in different applications. To that end, the web mining and clustering system 214 may include an analytics server 218 that is communicatively coupled to the cluster generation server 216. The analytics server 218 may receive the generated clusters from the cluster generation server 216. Further, the analytics server 218 may determine a context corresponding to data associated with each of the generated clusters. In one embodiment, the analytics server 218 may extract session information corresponding to a user from the plurality of primitive datasets and infer user preferences and behavior based on the extracted session information. The analytics server 218 may further evaluate data corresponding to the user preferences and behavior in light of information corresponding to a known customer base and demographics to determine if the user preferences and behavior match any characteristics corresponding to the known customer base.

By way of example, the analytics server 218 may analyze session information corresponding to the users who access the website 202, the website 204, and/or the website 206. The analysis may identify users interested in a gardening section of the website 202, tools on the website 204, and a financial transaction of a certain amount on the website 206 combined in the same cluster. Upon evaluating user behavior corresponding to each of the websites 202, 204 and 206, the analytics server 218 may identify behavior of a set of users on the website 202 as corresponding to gardening tips. Furthermore, the analytics server 218 may identify behavior of the set of users on the website 204 as corresponding to gardening tools and on the website 206 as corresponding to purchase of gardening tools. Thus, the analytics server 218 may identify behavior of the set of users approaching a common context of gardening related information and, therefore, may associate the identified context to the cluster corresponding to the set of users.

Further, the clusters with associated contexts may be communicated to a plurality of systems for use in different applications. In one embodiment, the clusters and identified contexts may be communicated to a recommendation system 220, a behavioral targeting advertisement system 222 and/or a personalization system 224. Based on the typical and/or atypical behavior of users belonging to a particular cluster, the recommendation system 220, the behavioral targeting advertisement system 222 and/or the personalization system 224 may dynamically provide the user with a personalized product recommendation, personalized website structure and content and targeted advertisements, respectively.

By way of example, patrons of a library may be clustered based on their reading habits. A typical behavior corresponding to a cluster may be identified as relating to works of Dr. Seuss and Eric Carle along with some motifs of less well-known children's authors. If a newly added patron exhibits typical behavior corresponding to the cluster by browsing for books by Dr. Seuss and Eric Carle, but also exhibits an atypical behavior of browsing for books by Sandra Boynton, books authored by Sandra Boynton may be recommended to other members of the cluster. Alternatively, if works of certain lesser-known children's authors correspond to atypical behavior corresponding to the cluster, the works of these lesser-known children's authors may be recommended to the newly added patron. Similarly, personalized webpage content and structure and product and service offerings may be recommended to the newly added patron and/or existing patrons in the cluster. A method for adaptive web mining and clustering that may be used to provide useful information to different applications will be discussed in greater detail with reference to FIG. 3.

Figure 3:
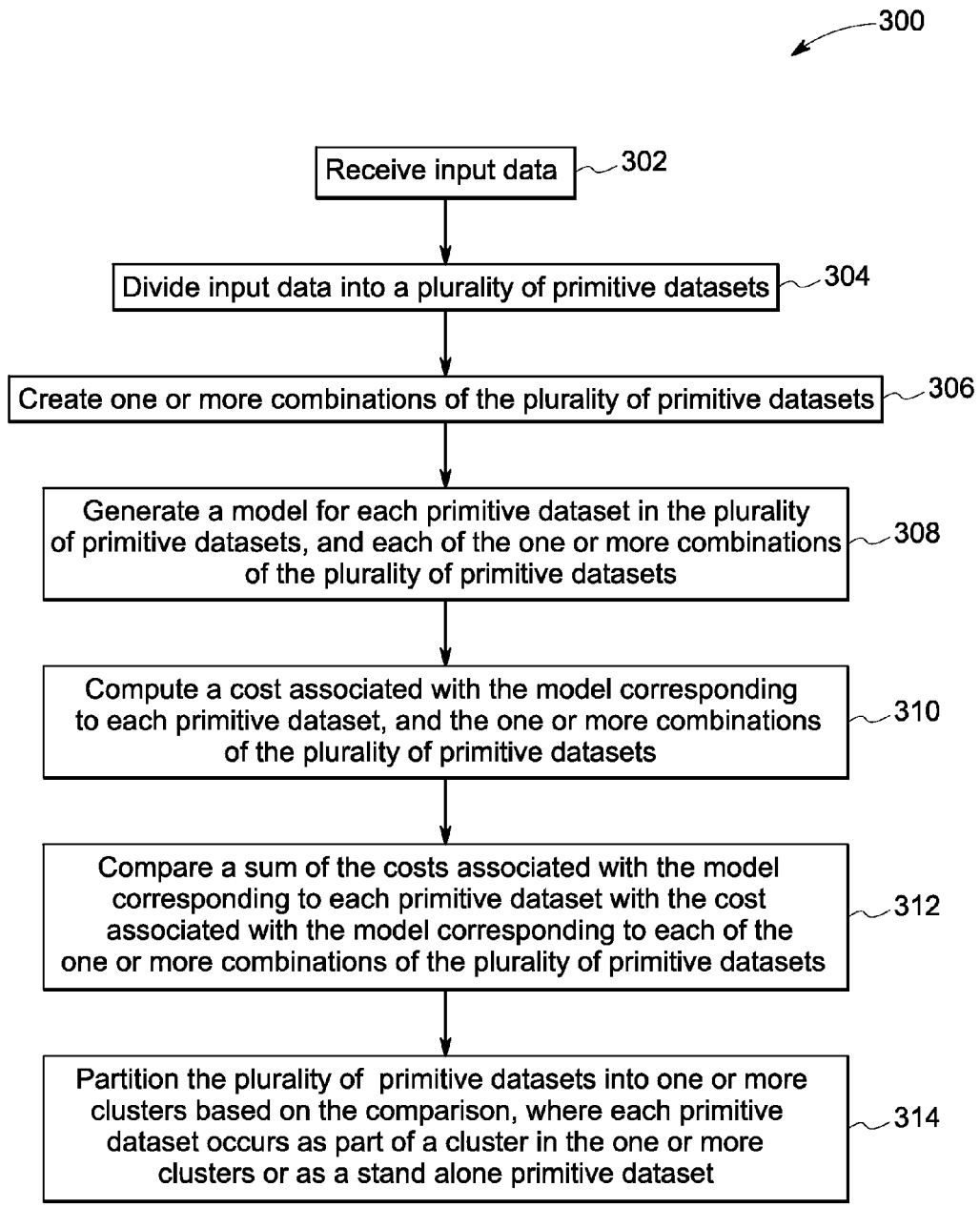
FIG. 3 is a flow chart illustrating an exemplary method for adaptive web mining and clustering, in accordance with aspects of the present technique.

Turning to FIG. 3, a flowchart 300 depicting an exemplary method for web mining and clustering is illustrated. The method may be described in a general context of computer executable instructions. Generally, computer executable instructions may include routines, programs, objects, components, data structures, procedures, modules, functions, and the like that perform particular functions or implement particular abstract data types. The method may also be practised in a distributed computing environment where optimization functions are performed by remote processing devices that are linked through a communication network. In a distributed computing environment, the computer executable instructions may be located in both local and remote computer storage media, including memory storage devices.

Further, in FIG. 3, the exemplary method is illustrated as a collection of blocks in a logical flow graph, which represents a sequence of operations that may be implemented in hardware, software, or combinations thereof. The various operations are depicted in the blocks to illustrate the functions that are performed generally during the division of input data, model generation, model cost calculation, cost comparison and partitioning of the primitive dataset phases of a web mining application, in accordance with aspects of the present technique. In the context of software, the blocks represent computer instructions that, when executed by one or more processing subsystems, perform the recited operations. The order in which the exemplary method is described is not intended to be construed as a limitation, and any number of the described blocks may be combined in any order to implement the method disclosed herein, or an equivalent alternative method. Additionally, individual blocks may be deleted from the exemplary method without departing from the spirit and scope of the subject matter described herein. For purposes of discussion, the exemplary method will be described with reference to the implementations of FIGS. 1-2.

In accordance with aspects of the present technique, at step 302, a web mining and clustering system such as the web mining and clustering system 100 of FIG. 1 receives input data, such as input data 102 of FIG. 1, from one or more data sources. As previously noted, the data sources may include websites, mobile applications, and/or data measurement systems communicatively coupled to the web mining and clustering system. Further, the input data may correspond to user-based data, web server data, and/or web transaction data. Specifically, the input data may correspond to an input data stream, log data, click stream data, web-graphics information, inquiries and search requests, registration information, demographic information, transactional information, weblogs, or combinations thereof.

Further, the web mining and clustering system divides the input data into a plurality of primitive datasets, as depicted by step 304. By way of example, in one embodiment, the web mining and clustering system generates primitive datasets from each 1000 bytes of the input data such that the primitive datasets do not include any assumptions and/or bias during clustering. In certain embodiments, the web mining and clustering system pre-processes the input data based on application and/or user requirements. Additionally, the web mining and clustering system creates one or more combinations of the primitive datasets by combining one or more of the primitive datasets, as indicated by step 306. It may be noted that each combination includes two or more primitive datasets.

Further, at step 308, the web mining and clustering system generates a model for each primitive dataset in the plurality of primitive datasets, and each of the one or more combinations of the plurality of primitive datasets. In one embodiment, the web mining and clustering system employs the MDLcompress algorithm to generate the model corresponding to each primitive dataset and each combination of the primitive datasets. Conventional statistical techniques typically require the primitive datasets to be partitioned into events in order to count instances of occurrence. The MDLcompress algorithm, however, naturally partitions the primitive datasets into clusters by generating models that effectively compress input data based on a cost associated with the model. The MDLcompress algorithm, therefore, may identify meaningful patterns in the plurality of primitive datasets with minimal or no assumptions, biases or prejudices and without over-fitting. Specifically, in one embodiment, the MDLcompress algorithm uses MDL principles from the Kolmogorov complexity and algorithmic information theory to infer a grammar for finding patterns and motifs that achieve a high degree of compression in datasets without using any assumptions. To that end, the MDLcompress algorithm infers a two-part MDL code for generating a model corresponding to each primitive dataset and each combination of primitive datasets. Moreover, in certain embodiments, the MDLcompress algorithm avoids relying on assumptions or known contexts that may bias the resultant clusters towards what is already expected. The MDLcompress algorithm, thus, provides an objective means to generate models that identify key patterns in the primitive datasets, model user behavior and cluster groups of like users.

Subsequently, the web mining and clustering system computes a cost associated with the model corresponding to each primitive dataset and each combination of the primitive datasets, as depicted by step 310. As previously noted, the cost associated with a particular model corresponds to a number of bits required to represent a particular primitive dataset and the model generated for the particular primitive dataset. Specifically, in one embodiment, the computed cost indicates a degree of compression of the primitive dataset that may be achieved by the corresponding model.

Referring now to step 312, the web mining and clustering system compares a sum of the costs associated with the model corresponding to each primitive dataset with the cost associated with the model corresponding to each combination of the primitive datasets. Such an exemplary cost comparison will be described in greater detail with reference to FIGS. 4-5.

Further, at step 314, the plurality of primitive datasets is partitioned into one or more clusters based on the cost comparison. Particularly, the plurality of primitive datasets is partitioned into one or more clusters such that each primitive dataset is a part of a cluster or a stand-alone primitive dataset. The clustered datasets are subsequently analyzed for discovering key patterns related to user behavior in order to personalize user experience, optimize web architecture, and/or provide relevant recommendations.

Figure 4:
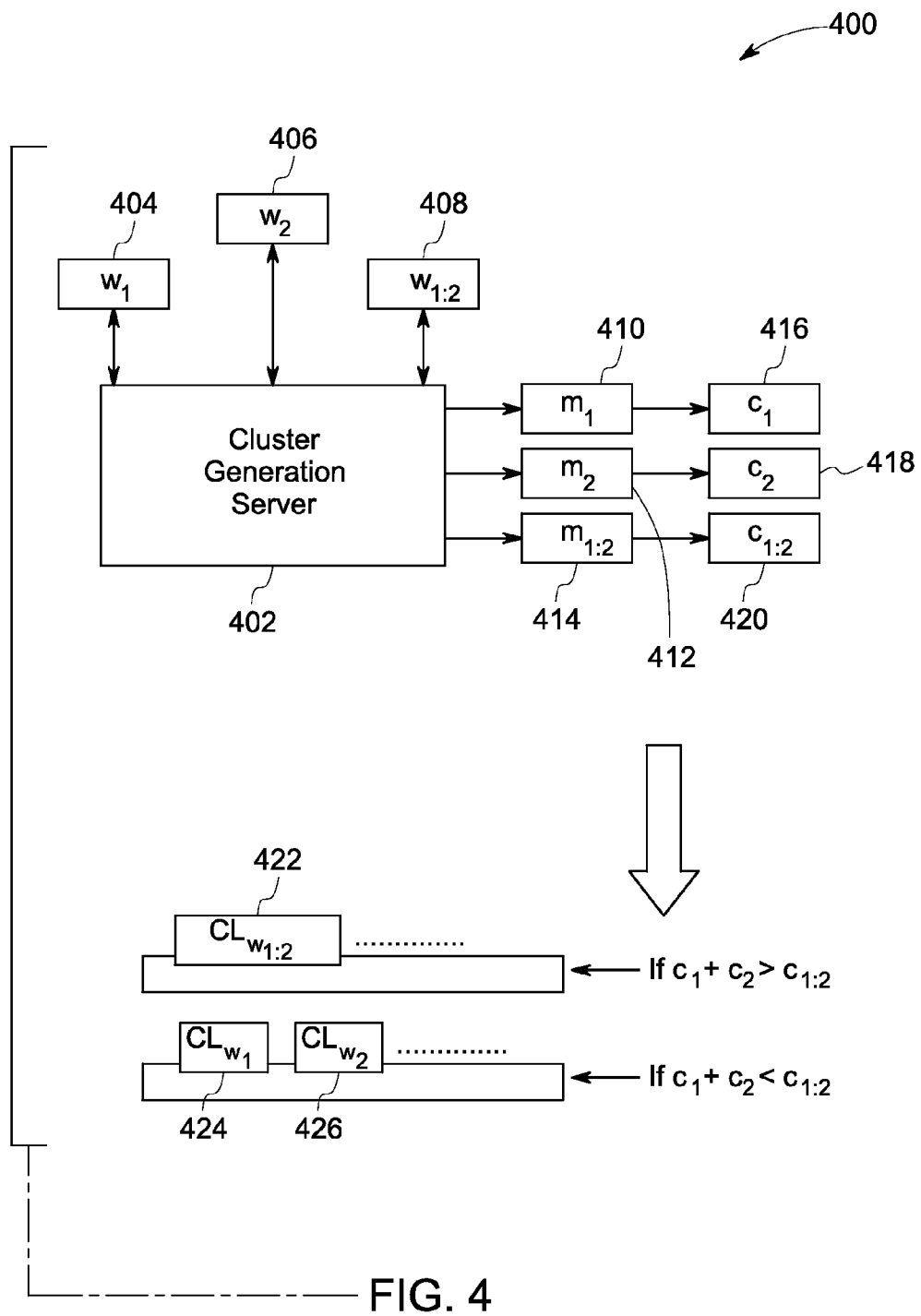
FIG. 4 is a block diagram representation of the exemplary method of FIG. 3 for adaptive web mining and clustering, in accordance with aspects of the present technique.

Moving to FIG. 4, a block diagram representation 400 of the exemplary method of FIG. 3 for adaptive web mining and clustering is depicted. As illustrated in FIG. 4, a cluster generation server 402, such as the cluster generation server 216 of FIG. 2, receives input data from different data sources such as websites, mobile applications, and so on. The cluster generation server 402 divides the input data into a plurality of primitive datasets $(w_1)$ 404 and $(w_2)$ 406 and one or more combinations $(w_{1:2})$ 408 of the plurality of primitive datasets $(w_1)$ 404 and $(w_2)$ 406. Further, the cluster generation server 402 uses the MDLcompress algorithm to generate models $(m_1)$ 410 and $(m_2)$ 412 corresponding to primitive datasets $(w_1)$ 404 and $(w_2)$ 406, respectively. Additionally, the cluster generation server 402 uses the MDLcompress algorithm to generate a model $(m_{1:2})$ 414 corresponding to a combination $(w_{1:2})$ 408 of the primitive datasets $(w_1)$ 404 and $(w_2)$ 406. Subsequently, a cost $(c_1)$ 416 associated with the model $(m_1)$ 410 corresponding to the primitive dataset $(w_1)$ 404, and a cost $(c_2)$ 418 associated with the model $(m_2)$ 412 corresponding to the primitive dataset $(w_2)$ 406 is computed. Additionally, a cost $(c_{1:2})$ 420 associated with the model $(m_{1:2})$ 414 corresponding to the combination $(w_{1:2})$ 408 of the primitive datasets $(w_1)$ 404 and $(w_2)$ 406 is computed. As previously noted, a cost associated with a particular model corresponds to the number of bits required to represent the particular model and a corresponding primitive dataset or a corresponding combination of primitive datasets. By way of example, in one embodiment, the cost associated with the model $(m_1)$ 410 corresponds to a sum of a number of bits required to represent the model $(m_1)$ 410 and a number of bits required to represent the primitive dataset $(w_1)$ 404.

Further, a sum of the costs $(c_1)$ 416 and $(c_2)$ 418 associated with the models $(m_1)$ 410 and $(m_2)$ 412 corresponding to the primitive datasets $(w_1)$ 404 and $(w_2)$ 406, respectively is compared with the cost $(c_{1:2})$ 420 associated with the model $(m_{1:2})$ 414 corresponding to the combination $(w_{1:2})$ 408 of the primitive datasets $(w_1)$ 404 and $(w_2)$ 406. If the sum of the costs $(c_1)$ 416 and $(c_2)$ 418 is greater than the cost $(c_{1:2})$ 420, the model $(m_{1:2})$ 414 is selected for clustering and accordingly the primitive datasets $(w_1)$ 404 and $(w_2)$ 406 are grouped together to form a cluster $(CL_{w1:2})$ 422. However, the models $(m_1)$ 410 and $(m_2)$ 412 are used to represent the primitive datasets $(w_1)$ 404 and $(w_2)$ 406 as stand-alone primitive datasets $(CL_{w1})$ 424 and $(CL\ w_2)$ 426 if the sum of the costs $(c_1)$ 416 and $(c_2)$ 418 is less than the cost $(c_{1:2})$ 420. Thus, in accordance with aspects of the present technique, a model corresponding to a primitive dataset is selected for clustering if a cost associated with the model is less than a cost associated with models corresponding to other primitive datasets or combinations of primitive datasets.

Figure 5:
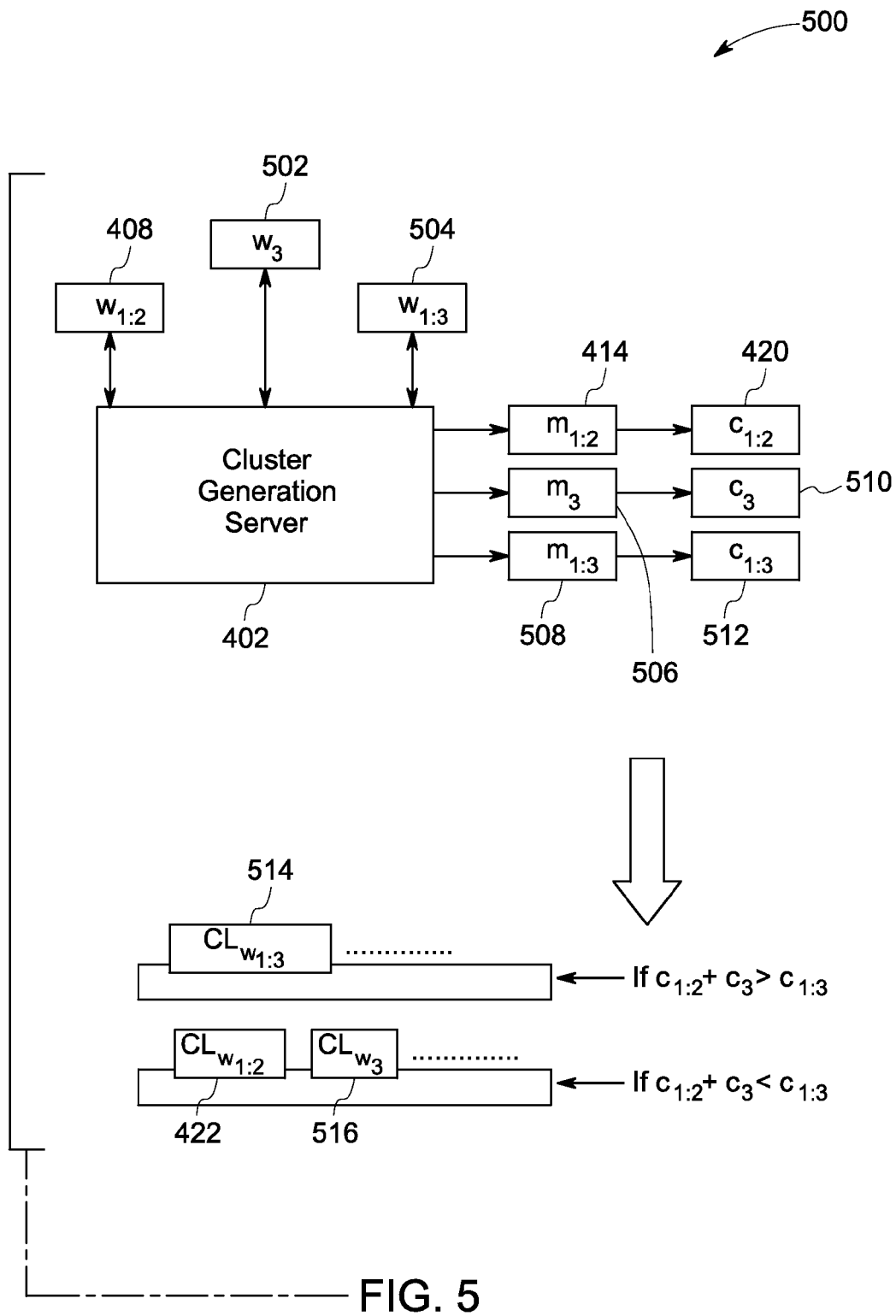
FIG. 5 is a block diagram representation of another embodiment of the exemplary method of FIG. 4 for adaptive web mining and clustering, in accordance with aspects of the present technique.

Similarly, FIG. 5 illustrates a block diagram representation 500 of another embodiment of the exemplary method illustrated in FIG. 4. Specifically, FIG. 5 illustrates an exemplary method for generating a new model for a subsequently received primitive dataset $(w_3)$ 502. The exemplary method for generating the new model may be used after the primitive datasets $(w_1)$ 404 and $(w_2)$ 406 of FIG. 4 are grouped together in the cluster $(CL_{w1:2})$ 422 of FIG. 4.

As illustrated in FIG. 5, the cluster generation server 402 receives the subsequently received primitive dataset $(w_3)$ 502, the combination $(w_{1:2})$ 408 of the primitive datasets $(w_1)$ 404 and $(w_2)$ 406 of FIG. 4 and a combination $(w_{1:3})$ 504 of the subsequently received primitive dataset $(w_3)$ 502 and the combination $(w_{1:2})$ 408. Further, the cluster generation server 402 generates a model $(m_3)$ 506 corresponding to the subsequently received dataset $(w_3)$ 502. Additionally, another model $(m_{1:3})$ 508 corresponding to the combination $(w_{1:3})$ 504 of the subsequently received primitive dataset $(w_3)$ 502 and the combination $(w_{1:2})$ 408 of the primitive datasets $(w_1)$ 404 and $(w_2)$ 406 are generated. In an alternative embodiment, if the exemplary method depicted in FIG. 4 terminates with formation of the stand-alone primitive datasets $(CL_{w1})$ 424 and $(CL_{w2})$ 426, a model (not shown) corresponding to the combination 508 of the subsequently received primitive dataset $(w_3)$ 502 and primitive dataset $(w_1)$ 404 are generated. Additionally, a model (not shown) corresponding to the combination 508 of the subsequently received primitive dataset $(w_3)$ 502 and primitive dataset $(w_2)$ 406 is generated. For purposes of brevity, in the present description, only a clustering of the subsequently received primitive dataset $(w_3)$ 502 with the combination $(w_{1:2})$ 408 of the primitive datasets $(w_1)$ 404 and $(w_2)$ 406 by using at least one of the models $(m_{1:2})$ 414, $(m_3)$ 506 and $(m_{1:3})$ 508 will be described.

In accordance with aspects of the present technique, a cost $(c_3)$ 510 associated with the model $(m_3)$ 506 corresponding to the subsequently received primitive dataset $(w_3)$ 502 is computed. Similarly, a cost $(c_{1:3})$ 512 associated with the model corresponding to the combination $(w_{1:3})$ 504 of the subsequently received primitive dataset $(w_3)$ 502 and the combination $(w_{1:2})$ 408 of the primitive datasets $(w_1)$ 404 and $(w_2)$ 406 of FIG. 4 is also computed.

Subsequently, a sum of the costs $(c_3)$ 510 and $(c_{1:2})$ 420, respectively associated with the model $(m_3)$ 506 corresponding to the subsequently received primitive dataset $(w_3)$ 502 and the model $(m_{1:2})$ 414 corresponding to the combination $(w_{1:2})$ 408 of the primitive datasets $(w_1)$ 404 and $(w_2)$ 406, is computed. This sum is compared with the cost $(c_{1:3})$ 512 associated with the model $(m_{1:3})$ 508 corresponding to the combination $(w_{1:3})$ 504 of the subsequently received primitive dataset $(w_3)$ 502 and the combination $(w_{1:2})$ 408 of the primitive datasets $(w_1)$ 404 and $(w_2)$ 406. If the sum of the costs $(c_3)$ 510 and $(c_{1:2})$ 420 is greater than the cost $(c_{1:3})$ 512, the subsequently received primitive dataset ($w_3$) 502 is added to the cluster ($CL_{w1:2}$) 422 of FIG. 4 to form a cluster ($CL_{w1:3}$) 514. Alternatively, the subsequently received primitive dataset ($w_3$) 502 may be represented as a stand-alone primitive dataset ($CL_{w3}$) 516 if the sum of the costs ($c_3$) 510 and ($c_{1:2}$) 420 is less than the cost ($c_{1:3}$) 512.

A combination of more than two input primitive datasets, thus, may be evaluated using multiple iterations of cost computations and cost comparisons, in accordance with aspects of the present technique. Based on the evaluation, the plurality of primitive datasets is partitioned into the one or more clusters. Particularly, the plurality of primitive datasets is partitioned into one or more clusters such that each primitive dataset is a part of a cluster or a stand-alone primitive dataset. The clustered data is subsequently analyzed for discovering key patterns related to user behavior in order to personalize user experience, optimize web architecture, and/or provide relevant recommendations.

The system and method disclosed hereinabove, thus, provide an effective framework for identifying key patterns in the input data, model user behavior and cluster groups of like users. Particularly, the system and method enable automatic pattern extraction and evaluation for clustering rather than using a subjective expert as in conventional data mining systems. Further, the exemplary system and method may be applied to independent browsing sessions towards identifying user-context switching as well as identifying atypical behavior or interests that are not part of a main clustered group. Thus, the exemplary method and system may provide an opportunity to quickly identify a user's current behavior as approaching a common pattern in order to serve dynamic content in a current Internet browsing session, as well as serve dynamic advertising or recommendations.

Although the exemplary embodiments in the present technique are described with reference to mining and clustering of web content, the present technique may be used in a plurality of operating environments and systems for mining and clustering different types of data. By way of example, the present technique may be used for similarity searching in medial image databases, bioinformatics, image analysis, market research, software code evolution, and so on.

Furthermore, the foregoing examples, demonstrations, and process steps such as those that may be performed by the web mining and clustering system 100 and may be implemented by suitable code on a processor-based system, such as a general-purpose or special-purpose computer. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), or other media, which may be accessed by a processor-based system to execute the stored code.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of web mining, comprising:
    via one or more computer processing devices:
    receiving input data;
    dividing the input data into a plurality of primitive datasets;
    creating one or more combinations of the plurality of primitive datasets;
    generating a model for each primitive dataset in the plurality of primitive datasets and each of the one or more combinations of the plurality of primitive datasets;
    computing a cost associated with a model corresponding to each primitive dataset in the plurality of primitive datasets, and each of the one or more combinations of the plurality of primitive datasets;
    comparing a sum of the costs associated with the models corresponding to each primitive dataset in the plurality of primitive datasets with the cost associated with each model corresponding to each of the one or more combinations of the plurality of primitive datasets; and
    partitioning the plurality of primitive datasets into one or more clusters based on the comparison of the costs such that each primitive dataset is a part of a cluster in the one or more clusters or a stand-alone primitive dataset.

2. The method of claim 1, wherein partitioning the plurality of primitive datasets into one or more clusters comprises grouping the plurality of primitive datasets into the one or more clusters upon determining that the sum of the costs associated with the models corresponding to each primitive dataset in the plurality of primitive datasets is greater than the cost associated with each model corresponding to each of the one or more combinations of the plurality of primitive datasets.

3. The method of claim 1, wherein partitioning the plurality of primitive datasets into one or more clusters comprises forming the stand-alone primitive dataset when the sum of the costs associated with the models corresponding to each primitive dataset in the plurality of primitive datasets is less than the cost associated with each model corresponding to each of the one or more combinations of the plurality of primitive datasets.

4. The method of claim 1, wherein the input data comprises an input data stream, log data, click-stream data, web server data, web transaction data, or combinations thereof.

5. The method of claim 1, wherein generating the model for each primitive dataset in the plurality of primitive datasets and each of the one or more combinations of the plurality of primitive datasets comprises applying a compression algorithm.

6. The method of claim 5, wherein the compression algorithm is a grammar-based algorithm based on minimum description length principles.

7. The method of claim 1, wherein computing a cost associated with a model corresponding to each primitive dataset in the plurality of primitive datasets and each of the one or more combinations of the plurality of primitive datasets comprises determining a number of bits required to represent each primitive dataset in the plurality of primitive datasets and the corresponding models and each of the one or more combinations of the plurality of primitive datasets and the corresponding models.

8. The method of claim 1, further comprising:
    determining a pattern corresponding to each of the one or more clusters or the stand-alone primitive dataset; and
    displaying an advertisement, recommending content, personalizing a website, or combinations thereof, based on the determined pattern.

9. The method of claim 8, wherein determining the pattern corresponding to each of the one or more clusters or each stand-alone primitive dataset comprises determining a typical characteristic, an atypical characteristic, or both the typical characteristic and the atypical characteristic corresponding to each of the one or more clusters or each stand-alone primitive dataset.

10. The method of claim 9, further comprising displaying the advertisement, recommending content, personalizing the website, or combinations thereof, based on the determined typical characteristic, the determined atypical characteristic, or a combination thereof, corresponding to each of the one or more clusters or each stand-alone primitive dataset.

11. A web mining and clustering system, comprising:
one or more computer processing devices, comprising:
a pre-processor that receives input data and generates a plurality of primitive datasets and one or more combinations of the plurality of primitive datasets using the input data;
a grammar generator that generates a model corresponding to each primitive dataset in the plurality of primitive datasets, and the one or more combinations of the plurality of primitive datasets, wherein the grammar generator is operationally coupled to the pre-processor;
a grammar applicator that computes a cost associated with the model corresponding to each primitive dataset in the plurality of primitive datasets, and the one or more combinations of the plurality of primitive datasets; and
a classifier that partitions the plurality of primitive datasets into one or more clusters based on a comparison of a sum of the costs associated with the models corresponding to each primitive dataset in the plurality of primitive datasets with the cost associated with each model corresponding to each of the one or more combinations of the plurality of primitive datasets such that each primitive dataset is a part of a cluster in the one or more clusters or a stand-alone primitive dataset.

12. The web mining and clustering system of claim 11, further comprising an input database that stores the plurality of primitive datasets and the one or more combinations of the plurality of primitive datasets.

13. The web mining and clustering system of claim 11, wherein the input data comprises an input data stream, log data, click-stream data, web server data, web transaction data, or combinations thereof.

14. The web mining and clustering system of claim 11, wherein the grammar generator generates the models corresponding to each primitive dataset in the plurality of primitive datasets and the one or more combinations of the plurality of primitive datasets by applying a compression algorithm.

15. The web mining and clustering system of claim 14, wherein the compression algorithm is a grammar-based algorithm based on minimum description length principles.

16. The system of claim 11, wherein the grammar applicator computes a cost associated with a model corresponding to each primitive dataset in the plurality of primitive datasets and each of the one or more combinations of the plurality of primitive datasets based on a number of bits required to represent each primitive dataset in the plurality of primitive datasets and the corresponding models and each of the one or more combinations of the plurality of primitive datasets and the corresponding models.

17. The web mining and clustering system of claim 11, further comprising a post-processor that:
determines a pattern corresponding to each of the one or more clusters; and
displays an advertisement, recommends content, personalizes a website, or combinations thereof, based on the determined pattern.

18. The web mining and clustering system of claim 17, wherein the post-processor determines a typical characteristic, an atypical characteristic, or both the typical characteristic and the atypical characteristic corresponding to each of the one or more clusters or each stand-alone primitive dataset.

19. The method of claim 18, wherein the post-processor displays the advertisement, recommends content, personalizes the website, or combinations thereof, based on the determined typical characteristic, the determined atypical characteristic, or a combination thereof, corresponding to each of the one or more clusters or each stand-alone primitive dataset.

20. A non-transient computer readable media embodying instructions for web mining and clustering, which when executed by a processor cause the computer to execute the steps of:
receiving input data;
dividing the input data into a plurality of primitive datasets;
creating one or more combinations of the plurality of primitive datasets;
generating a model for each primitive dataset in the plurality of primitive datasets and each of the one or more combinations of the plurality of primitive datasets;
computing a cost associated with a model corresponding to each primitive dataset in the plurality of primitive datasets, and each of the one or more combinations of the plurality of primitive datasets;
comparing a sum of the costs associated with the models corresponding to each primitive dataset in the plurality of primitive datasets with the cost associated with each model corresponding to each of the one or more combinations of the plurality of primitive datasets; and
partitioning the plurality of primitive datasets into one or more clusters based on the comparison of the costs such that each primitive dataset is a part of a cluster in the one or more clusters or a stand-alone primitive dataset.

* * * * *